United States Patent

[11] 3,617,394

| [72] | Inventor | Ivan Mayer |
| | | Summit, N.J. |
| [21] | Appl. No. | 778,308 |
| [22] | Filed | Nov. 22, 1968 |
| [45] | Patented | Nov. 2, 1971 |
| [73] | Assignee | Esso Research and Engineering Company |

[54] KILN PASSIVATION OF REDUCED ORES
7 Claims, No Drawings

[52] U.S. Cl. .................................................. 148/6.35,
75/.5 BA, 75/34
[51] Int. Cl. ................................................ C23f 7/04,
C21b 1/00
[50] Field of Search ........................................... 148/6.35;
75/34, 35, .5 BA

[56] References Cited
UNITED STATES PATENTS

| 2,766,108 | 10/1956 | Eberhardt et al. | 75/.5 |
| 3,199,974 | 8/1965 | Johnson et al. | 75/.5 |
| 3,386,816 | 6/1968 | English | 75/34 X |
| 3,479,232 | 11/1969 | Broussard | 148/6.35 |

*Primary Examiner*—Ralph S. Kendall
*Attorney*—Manahan and Wright

ABSTRACT: A process is described for passivating active forms of finely divided metal particles by mildly oxidizing their surfaces at high temperatures in a rotating kiln.

KILN PASSIVATION OF REDUCED ORES

BACKGROUND OF THE INVENTION

This invention relates to the art of passivating particulate metals, particularly ferrous metals, by forming protective films, surfaces or coatings on such metals.

There has been a longfelt need for methods of cooling and passivating particulate forms of metals. This is particularly true in the iron and steel industry where, for example, direct ore reduction processes are becoming of increasing interest. In direct reduction processes, metallic iron is produced by subjecting iron ore, at temperatures below the melting point of the ore, to direct contact with hot reducing gas, or reducing gas mixtures.

Powered metals withdrawn from direct iron ore reduction processes are very highly active in varying degrees and readily chemically react when exposed to various environments. For example, powdered iron produced by reducing iron oxides with hydrogen-rich gases tend to be highly pyrophoric and such product will oxidize or burn if directly exposed to air or other oxygen-containing gas, even at relatively low temperatures. Iron ores that are reduced at relatively low hydrogen concentrations and high temperatures, tend to be less pyrophoric on initial exposure but still possess an acute tendency, even after cooling, to be quite reactive. The metal can become severely reoxidized, or back-oxidized, on continued exposure to an oxygen-containing gas, thus greatly decreasing its value. Moreover, when the reduced iron product is dampened or wetted, as by atmospheric moisture, rain or spray, the problem can become even more serious because hydrogen can be liberated. The hydrogen can, under certain circumstances, ignite to produce fires or cause explosions.

Two reactions are believed primarily responsible for the oxidation, and ignition, of a reduced iron product. A first reaction, which is only slightly exothermic, involves reaction between iron and water to produce iron oxides and hydrogen, as represented by the equations:

$$2Fe + 3H_2O \longrightarrow Fe_2O_3 + 3H_2, \text{ and}$$
$$3Fe + 4H_2O \longrightarrow Fe_3O_4 + 4H_2.$$

The second reaction, which is highly exothermic, involves reaction between iron and oxygen to ultimately form iron oxides, as represented by the following equations:

$$4Fe + 3O_2 \longrightarrow 2Fe_2O_3, \text{ and}$$
$$3Fe + 2O_2 \longrightarrow Fe_3O_4.$$

Fires are caused when the reduced particulate iron product is stored under circumstances such that the heat generated by the foregoing reactions cannot be sufficiently rapidly dissipated. Eventually, the heat generated from the hydrogen generation reaction builds up until the temperature reaches a point where the air oxidation of iron becomes the controlling reaction. The latter reaction, being strongly exothermic, may ignite the hydrogen, the combustion of which liberates still more heat, which sustains and increases the rate of the oxidation reaction. Under these conditions, the reactions can continue until essentially all of the metallic iron has been rapidly back-oxidized to iron oxides.

The production of a passivated particulate reduced iron product suitable for handling and shipping is a very desirable objective and would represent a great stride forward in the art. Attempts have been made to passivate the particulate reduced iron product from direct iron ore reduction processes, but these attempts have not generally been successful.

The foregoing and other disadvantages and difficulties associated with handling and shipping such powdered metal products are known to the art. It has long been felt desirable to develop more effective ways and means of quenching and passivating hot, active powdered metals, particularly ferrous metals such as those produced in direct iron ore reduction processes.

It is, accordingly, the primary objective of the present invention to provide a method for passivating particulate metals. In particular, it is an object to obviate the foregoing and other disadvantages by providing a method for passivating active metals and for quenching, cooling, and passivating such metals by forming protective films on the metals, especially ferrous metals, while in particulate form. More particularly, it is an object to render particulate metals, passive and resistant to back-oxidation so that they can be handled and stored. It is a specific object to provide a method for passivation, or cooling and passivation, of ferrous metals produced by direct reduction processes, especially fluidized iron ore reduction processes.

SUMMARY OF THE INVENTION

This invention contemplates passivating, or cooling and passivating, active, high-temperature, particulate reduced iron ore by passing the ore through a rotating kiln and contacting it during passage therethrough with a gaseous oxidizing agent. The ore is generally introduced at high temperatures ranging from about 200° F. to about 1,400° F., preferably about 300° F. to 700° F. into a kiln rotating at a peripheral speed of at least about 10 ft./min., preferably about 120 to 240 ft./min., and maintained therein in contact with the oxidizing gas for a time sufficient to slightly back-oxidize the reduced ore particle surfaces, preferably about 5 minutes to about 1 hour, thereby rendering them passive and resistant to further oxidation. The kiln rotating speeds may vary outside the indicated ranges. However, it is generally undesirable, since at very low speeds the required residence time to obtain substantial passivation may be so long as to be impractical and at very high rotating speeds the particles may pass through the kiln too rapidly for adequate passivation or may tend to be entrained excessively in the oxidizing gas, especially when very fine particle sizes are employed.

The oxidizing gases used in accordance with this invention can be steam or carbon dioxide or oxygen diluted with inert gases such as nitrogen, or mixtures of these gases. Preferably, steam or steam plus a small amount of oxygen is used. The latter mixture is especially preferred where highest degrees of passivation are desired. Also, it is generally desirable to use small quantities of free oxygen in the oxidizing gases to permit the fastest feasible passivation of the reduced ore particle surfaces. It is important, however, to maintain the free oxygen content at below about 12 mole percent to avoid forming explosive iron-oxygen mixtures. Where explosive gas constituents may be present, e.g., hydrogen liberated from contacting steam with iron particles at high-temperatures, temperatures, it is even more important to so limit the free oxygen concentration. The most preferred oxidizing gases for use in this invention contain steam with about 4 percent to about 8 percent, by volume, of oxygen.

The gas rate through the rotating kiln is maintained in amounts sufficient to provide about 0.005 to about 0.1 pound-atoms oxygen per pound-atom of metallic Fe to be passivated. Preferably, the oxidizing gases flow concurrently through the kiln with the iron particles to minimize exit gas temperatures. Countercurrent flow may, however, also be used.

The contacting of oxidizing gases with reduced iron ore particles at excessively high-temperatures, i.e., above about 700° F. for long periods of time should be avoided. When iron ore feed is introduced to the kiln at very high-temperatures, it should be rapidly cooled to temperatures within the range from about 200° F. to about 1,100° F., preferably from about 300° F. to about 700° F. to avoid excessive oxidation. Alternatively, the oxidizing gas can be introduced at a cooler point downstream in the kiln where the temperatures are within the foregoing ranges.

Rapid cooling can be achieved by using kilns which are adapted for heat transfer. For example, the rotating kiln can be composed of excellent heat conductors, i.e., mechanically suitable high-conductivity metals, sealed at the ends and partially submerged in a water bath. Excellent heat transfer is achieved in such apparatus. (Conventional coolers based on this concept are available, such as, e.g., Roto-Fin or Roto-Tube Coolers which have channels or conduits in the walls of the kiln which alternately fill with water and empty as the kiln rotates through a water bath, while on the inside or solids side, solids movement is insured without solids raining by means of a continuous spiral fin, this providing excellent heat transfer for cooling the contents of the kiln without serious entrainment.) By using such rotating kiln means for cooling reduced ore fines, it is possible to cool fines from temperatures as high as about 1,400° F. to temperatures below about 150° F. in times ranging from about 5 minutes to about 1 hour. Passivation can be achieved simultaneously in the time required for the cooling process to occur. Generally excellent passivation can be achieved while the particles are cooled from above about 700° F. to below about 300° F.

DESCRIPTION OF THE PREFERRED EMBODIMENTS

Oxidic iron ore is crushed and ground in conventional mills to form particles having fluidizable-size distributions. Generally the ore particles range from about 10 to about 10,000 microns and average about 50 to about 200 microns in diameter. The ore is fluidized and reduced by passing high-temperature reducing gases upwardly through a bed or beds of the ore for a time sufficient to lower the state of oxidation of the ore from initially $Fe_2O_3$ to a final product containing principally metallic Fe. The ore is reduced to metallizations ranging generally between about 80 percent and about 95 percent. (Metallization means the percentage of total iron which is present as metallic Fe.)

In a preferred process, the ore particles are reduced in a staged fluidized ore reduction process. In such a process the ore feed is introduced into an initial stage wherein it is preheated or preheated and reduced from $Fe_2O_3$ to compositions approximating $Fe_3O_4$. The preheated or partially-reduced material is then passed to additional fluidized beds or stages wherein it is progressively further reduced to FeO and, finally, to a product containing principally metallic Fe. The reducing gases used in the reduction contain hydrogen, carbon monoxide, or mixtures of these and other gases, and may include inert gases such as nitrogen.

The fluidized beds in the reduction process are maintained generally at temperatures between about 1,000° F. and about 1,800° F. Preferably the ferrous reduction zones, i.e., the zones wherein FeO is reduced to metallic Fe, are maintained at between about 1,300° F. and 1,600° F. At such high-temperatures it is generally desirable to add an antibogging agent, i.e., a material having a melting point higher than the melting point of iron, such as magnesium oxide, calcium oxide, dolomite, magnesium carbonate, calcium carbonate, titanium oxide, or the like, in finely divided form to the process to prevent the highly metallized ore from sticking together or agglomerating in the ferrous reduction zones.

Several samples of reduced iron ore were prepared in the foregoing manner and reduced to metallizations ranging from about 90 to 96 percent. The samples were passivated, or cooled and passivated simultaneously, by passing them through a rotating kiln-type cooler of conventional construction (à Roto-Tube Cooler manufactured by the Link Belt Company). The cooler was a laboratory-size cooler approximately 18 inches in inside diameter and approximately 3 feet long and was adapted to permit cooling water to pass through external fins or tubes as the kiln rotated through a bath of water. The tubes ran perpendicularly to the direction of flow of ore, i.e., circumferentially around the shell of the kiln. The function of the cooling water and tube arrangement is to increase the surfaces for heat transfer.

High-temperature reduced ore samples were fed into the kiln through a feed inlet at temperatures ranging from about 400° F. to above 1,000° F. as indicated in the table below. The above-described kiln, in which internal fins act as a screw feeder, conveys the reduced ore from the inlet to an outlet in a time ranging from about 5 minutes to about 18 minutes and rotated at 3 to 6 r.p.m. (i.e., about 14 to 28 ft./min.). The ends of the kiln are mechanically sealed to prevent air from entering the kiln. A small bleed gas stream of nitrogen was introduced around the seals in a manner to insure a net flow of nitrogen into the kiln (to prevent outward leakage of dust or gases and to prevent inward leakage of air). Various passivating agents, i.e., oxidizing gases, were introduced as indicated in the table at the compositions and flow rates shown.

Product was withdrawn from the kiln and compared with the feed relative to its passivity. Passivation was measured by two tests: (1) a sample of ore was submerged in water at 125° F. and the amount of hydrogen generated was mesured. The rate of hydrogen generation per ton of ore was then calculated; (2) piles of unpassivated and passivated ore were exposed to an outdoor environment, each pile being equipped with thermocouples to determine the maximum increase in temperature of the piles due to oxidation of Fe. The increase in temperature was then recorded. Low hydrogen generation rates and low pile temperature increases are desirable, indicating good passivation.

|  | Example | | | | | |
|---|---|---|---|---|---|---|
|  | 1 | 2 | 3 | 4 | 5 | 6 |
| Temperatures, ° F.: | | | | | | |
| Inlet | 980 | 990 | 400 | 408 | 1,050 | 1,102 |
| Outlet | 140 | 136 | 130 | 129 | 139 | 155 |
| Passivating gas | (¹) | (¹) | (¹) | (¹) | (²) | (³) |
| Free $O_2$, vol. percent | 4.2 | 4.2 | 4.2 | 6.8 |  | 8.0 |
| Lb.-atoms O/lb.-atoms Fe | 0.018 | 0.010 | 0.009 | 0.016 | ⁴0.035 | ⁵0.040 |
| Kiln speed, r.p.m. | 3.3 | 3.3 | 5.0 | 5.0 | 3.5 | 3.5 |
| Solids residence time, min. | 11 | 12 | 5 | 5 | 11 | 9 |
| Metallization, percent | | | | | | |
| Unpassivated | 96.4 | 96.4 |  |  |  |  |
| Passivated | 96.3 | 96.0 |  |  |  |  |
| $H_2$ generation, s.c.f.h./ton: | | | | | | |
| Unpassivated | 10.1 | 10.1 | 9.7 | 9.7 | 11.6 | 9.1 |
| Passivated | 0.8 | 1.8 | 3.8 | 2.7 | 0.5 | 2.7 |
| Pile heatup, ° F.: | | | | | | |
| Unpassivated | 56 | 56 | 75 | 75 |  | 51 |
| Passivated | 0 | 6 | 9 | 0 |  | 0 |

¹ Ambient air plus $N_2$.
² Steam plus $N_2$.
³ Steam plus $O_2$.
⁴ Calculated from steam as oxygen equivalent.
⁵ Calculated from steam plus free $O_2$.

By comparing examples 1 and 2, it is noted that by increasing the gas-to-iron ratio improved passivation is achieved. Also, by comparing examples 3 and 4, it is shown that increasing the oxygen concentration also improves the degree of passivation of the product. Example 5 and 6 illustrate that significant passivation can be achieved using steam in place of free oxygen, or in mixture with free oxygen.

Examples 1 and 2 show that essentially no loss of metallization occurs during the passivation step. However, when unpassivated reduced ore fines are stored in an outdoor environment for 3 days, it is found that over 3 percent metallization loss occurs. When a similar sample of product prepared according to example 1 is similarly stored, essentially no detectable change in metallization occurs. More importantly, passivated fines will not spontaneously combust or explode as highly active ones will.

It is indeed surprising that passivation can be be achieved in a rotating kiln type of apparatus, since the gas solids contacting in such apparatus is generally thought to be relatively poor. Surprisingly, however, it is found that passivation in a rotating kiln according to the instant invention is completely equivalent to passivation for similar lengths of time in a fluidized bed process wherein contacting is accepted as being outstanding. This is apparently because only a very small amount of oxidation is required for passivation so that little more than diffusional mass transfer may be required to bring sufficient oxygen in contact with the metal surfaces. Furthermore, by using the rotating kiln of the present invention, it is found that very small fractions, i.e., as little as 3 percent of oxidizing agents are required as would be required in fluidized bed treating processes. Moreover, the total gases required to be handled in the rotating kiln process are similarly only a fraction as great as those required in fluidized bed processes. This is especially noted when steam or steam plus oxygen is used as the oxidizing agent in the kiln as shown above in examples 5 and 6.

EXAMPLE 7

This example is carried out essentially as described above in example 6, except that carbon dioxide is used in place of steam. This has the advantage of being endothermic thus increasing the cooling effect in the rotating kiln in contrast to the exothermic heating effect which occurs when steam is used. This results in a lower required holding time or residence time in the kiln, while producing essentially identical passivated product.

In a variation of the procedure described in example 7, there is employed, in lieu of carbon dioxide alone, a mixture of finely divided lime (CaO), along with the $CO_2$. Under these conditions the carbon dioxide reacts with the lime and, simultaneously with the passivation of the reduced ore, forms a more or less impervious, hard calcium carbonate coating on the particles. The particles are also slightly agglomerated in forming the calcium carbonate coating. This results in easier product handling with lessened dust and possible contaminates for air pollution. Further, by properly selecting the amount of lime added, the reduced ore particles can be tailored to contain precisely the amount of lime required in specific steelmaking processes so that additional lime is not required when the material is converted to steel products.

It is contemplated for optimum commercial size kilns of 6-10-foot diameter that rotating speeds of about 120 to 240 ft./min. should be used. Simultaneously with increasing speeds, kiln diameter and length are also increased, the length being increased sufficiently to obtain similar residence times as disclosed herein.

Many variations will be apparent to those skilled in the art and it is intended that the full scope and spirit of the invention be given to the attached claims.

What is claimed is:

1. A process for passivating active reduced iron ore particles comprising introducing said particles into a kiln, said particles being at temperatures above about 700° F.; rotating said kiln whereby said particles pass through said kiln, said kiln being rotated at peripheral speeds of at least about 10 ft./min.; cooling said particles to temperatures below about 300° F., in times ranging from about 5 minutes to about 1 hour, while simultaneously contacting said particles in the kiln with a gaseous oxidizing agent selected from the group consisting of steam, carbon dioxide, oxygen diluted with an inert gas and mixtures thereof, said gaseous oxidizing agent being present in an amount sufficient to provide about 0.005 to about 0.1 pound-atoms of oxygen per pound-atom of metallic iron in said particles.

2. A process of claim 1 wherein said particles are cooled to temperatures below about 1,100° F. before contacting with said gaseous oxidizing agent.

3. The process of claim 1 wherein said particles are introduced at a temperature of about 1,100° F. and cooled to a temperature below about 150° F.

4. The process of claim 1 wherein said gaseous oxidizing agent contains less than about 12 mole percent free oxygen.

5. The process of claim 4 wherein said gaseous oxidizing agent comprises steam with about 4 percent to about 8 percent free oxygen.

6. The process of claim 1 wherein said reduced ore particles have metallizations in the range from about 80 percent to about 95 percent and particle sizes averaging about 50 to about 200 microns.

7. The process of claim 1 wherein said kiln rotates at peripheral speeds ranging from about 120 ft./min. to about 240 ft./min.

* * * * *